(12) United States Patent
Schrive et al.

(10) Patent No.: US 9,345,261 B2
(45) Date of Patent: May 24, 2016

(54) DEVICE FOR THE TREATMENT OF A PRODUCT BY A PULSED ELECTRIC FIELD

(75) Inventors: Luc Schrive, Pont Saint Esprit (FR); Florent Gandi, Saint Andre d'Olerargues (FR)

(73) Assignee: COMMISSARIAT A L' ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 350 days.

(21) Appl. No.: 14/002,153

(22) PCT Filed: Mar. 8, 2012

(86) PCT No.: PCT/EP2012/054050
§ 371 (c)(1),
(2), (4) Date: Aug. 29, 2013

(87) PCT Pub. No.: WO2012/123339
PCT Pub. Date: Sep. 20, 2012

(65) Prior Publication Data
US 2013/0341193 A1 Dec. 26, 2013

(30) Foreign Application Priority Data
Mar. 11, 2011 (FR) ..................... 11 52010

(51) Int. Cl.
*A23L 3/32* (2006.01)
*A23L 2/50* (2006.01)
*C02F 1/48* (2006.01)

(52) U.S. Cl.
CPC ... *A23L 3/32* (2013.01); *A23L 2/50* (2013.01); *C02F 1/48* (2013.01)

(58) Field of Classification Search
CPC ..... A23L 3/32; A23L 2/50; C02F 1/48–1/488
See application file for complete search history.

(56) References Cited

U.S. PATENT DOCUMENTS

| 5,048,404 A | 9/1991 | Bushnell |
| 5,235,905 A | 8/1993 | Bushnell |

(Continued)

FOREIGN PATENT DOCUMENTS

| DE | 945206 C | 7/1956 |
| FR | 1107346 A | 12/1955 |
| FR | 2792207 A1 | 10/2000 |
| GB | 696060 A | 8/1953 |

OTHER PUBLICATIONS

Sato et al., High-Efficiency Sterilizer by High-Voltage Pulse Using Concentrated-Field Electrode System, 37 (6) IEEE Transactions on Industry Applications 1646 (2001).*

(Continued)

*Primary Examiner* — Harry D Wilkins, III
*Assistant Examiner* — Ho-Sung Chung
(74) *Attorney, Agent, or Firm* — Pearne & Gordon LLP

(57) ABSTRACT

The invention relates to a device (1) for the treatment by a pulsed electric field of a product intended to circulate through this device, comprising first and second electrodes (4, 6) forming parallel plates between which a treatment zone (2), is defined, and also comprising a pulse generator (22) electrically connected to at least said first electrode (4) so as to be able to apply a pulsed electric field in the treatment zone (2), the device also comprising a product inlet conduit (26) into the treatment zone and a product outlet conduit (30).

According to the invention, the first electrode (4) is electrically connected to the pulse generator (22) through either of the two conduits (26, 30), arranged in contact with this first electrode.

9 Claims, 4 Drawing Sheets

(56) References Cited

U.S. PATENT DOCUMENTS

| | | |
|---|---|---|
| 5,326,446 A | 7/1994 | Binger |
| 5,514,391 A | 5/1996 | Bushnell |
| 6,093,432 A | 7/2000 | Mittal |
| 6,623,964 B2 | 9/2003 | Vernhes |
| 2002/0172738 A1 | 11/2002 | Young, III |
| 2004/0084381 A1 | 5/2004 | Korenev |
| 2006/0013927 A1 | 1/2006 | Geveke |
| 2006/0175263 A1 | 8/2006 | Rice |

OTHER PUBLICATIONS

Sato M et al: "High Efficiency Sterilizer by High Voltage Pulse Using Concentrated Field Electrodesystein", Industry Applications Conference, 2000, Conference Record of the 2000 IEEE Oct. 8-12, 2000, Piscataway, NJ, USA, IEEE, vol. 2, Oct. 8, 2000, pp. 784-787.
International Search Report for PCT/EP2012/054050 dated Aug. 6, 2012.

* cited by examiner

DEVICE FOR THE TREATMENT OF A PRODUCT BY A PULSED ELECTRIC FIELD

TECHNICAL DOMAIN

The invention relates to the domain of the treatment of products circulating through a device designed for this purpose.

For example, the invention relates to the treatment of liquid or semi-liquid foodstuffs such as milk, orange juice, fruit purée or egg whites.

The invention may also relate to the domain of water or sludge treatment, etc.

STATE OF PRIOR ART

Many studies have been carried out in prior art on pasteurisation techniques, considering the increased use of long life products for which there must be no micro-organisms present if they are to remain consumable after a long period.

Conventionally, pasteurisation consists of heating food to a defined temperature for a defined period so as to go beyond the thermal resistance threshold of pathogenic bacteria that cause deterioration of food. The heated food is then quickly cooled to temperatures of the order of 3 to 4° C. to maintain maximum organoleptic qualities of products.

There have been many variants to this conventional principle, in the so-called <<heat treatments>> category.

Heat treatments for pasteurisation may consist of using the following means as a heat transport vector:
electromagnetic radiation such as infrared radiation, microwave radiation;
heat from the Joule effect phenomenon created inside a tube in which the product to be pasteurised is circulating;
heat caused by pure resistance, due to an electric current passing through the product to be pasteurised.

Pasteurisation temperatures reached by thermal means are conventionally between 70° C. and 85° C. However, some pathogenic forms such as spores incompatible with food products may remain after treatment in these temperature ranges.

One solution for destroying these pathogenic forms may consist of heating the foodstuffs to a higher temperature than those mentioned above (for example at temperatures of more than 90° C.). However, the use of higher temperatures inevitably leads to denaturation of the treated product, such as denaturation of the proteins present in the product, which is often accompanied by a loss of the taste qualities of the product.

It has been proposed that these disadvantages can be overcome by the use of so-called <<low temperature>> processes so as to keep the original taste of the product. These processes consist of using means of eliminating pathogenic bacteria other than heating, so that foodstuffs can be treated at temperatures not exceeding 60° C. These means may consist of ionising radiation, the use of high pressures, pulsed light, or the use of a gas such as carbon dioxide.

Therefore, there are pulsed electric field treatment devices with effects that resemble electrocution of micro-organisms. Pulsed electric field treatment devices are classified into two categories depending on whether the electric field lines are approximately orthogonal to or approximately parallel to the general product flow direction, respectively. These devices are then referred to as transverse or longitudinal treatment devices. Transverse devices are well known for their low pressure losses and good uniformity of the pulsed field that they produce, especially when the electrodes form parallel plates.

In this respect, there are many known parallel plate transverse treatment devices according to prior art, particularly the device described in document JP 2000 102371.

Nevertheless, despite the existence of many embodiments in this domain, there is a need to optimise the design of treatment devices to make them more compact and/or easier to manufacture and/or easier to maintain throughout their life, in order to keep them in good operating condition.

Subject of the Invention

Therefore the purpose of the invention is to at least partially overcome the disadvantages mentioned above of embodiments according to prior art.

To achieve this, the purpose of the invention is a device for the treatment by a pulsed electric field of a product intended to circulate through the device comprising a first electrode and a second electrode forming parallel plates between which a treatment zone is defined, and also comprising a pulse generator electrically connected to at least said first electrode so as to be able to apply a pulsed electric field in the treatment zone through which the product will flow, said device also comprising a product inlet conduit into said treatment zone and a product outlet conduit through which the product exits from the treatment zone.

According to the invention, said first electrode is electrically connected to the pulse generator through either the inlet conduit or the outlet conduit, arranged in contact with this first electrode.

Therefore the invention is remarkable in that it uses the product inlet or outlet conduit to electrically connect the first electrode to the pulse generator. This conduit then performs two roles, namely to transfer the product into or out from the treatment zone, and to electrically connect the pulse generator and the first electrode.

In general, this specific feature simplifies the design of the treatment device, thus making it more compact and easier to make. This also simplifies disassembly necessary for maintenance, cleaning or repair of the device.

Furthermore, the choice of electrodes in the form of parallel plates can result in a transverse treatment device with a very uniform electric field in the treatment zone.

Preferably, said second electrode is in contact with the other product inlet or outlet conduit, this conduit being used to apply a potential with a lower absolute value than the potential for said first electrode, to said second electrode.

Consequently, the other of the two conduits also brings the second electrode to the required potential, for example by connecting it to the ground, earth, or even to a second output terminal from the pulse generator.

Preferably, said product inlet conduit and outlet conduit are oriented to be approximately orthogonal to said first and second electrodes.

Preferably, said first and second electrodes are kept at a certain distance from each other by an electrically insulating seal squeezed between these two electrodes, for example by bolts. The design is thus very simple, and assembly and disassembly are simple in practice. The thickness of the seal compressed between the two electrodes is then equal to the height of the treatment zone. This simplified design also minimises the presence of grooves or cracks in which micro-organisms that could not be suitably treated during the first electric pulses, could be trapped. In this unwanted case, it is known that a single micro-organism can multiply and form a colony of micro-organisms capable of contaminating the product flowing close to said colony.

Preferably, said treatment zone is defined exclusively by the seal and by the first and second electrodes. Therefore the number of constituent elements is very low, making the device extremely easy to manufacture. Preferably, in this configuration, the product to be treated is only in contact with two different materials, one used to make the electrodes and the other used to make the seal. This thus avoids/limits geometric and material heterogeneities in the surroundings of a triple point composed of a conductor (the electrode), an insulator (the seal) and a liquid.

Preferably, each of said first and second electrodes has one edge with no sharp corner. This limits possible electrode corrosion and erosion problems, particularly at right angles, from which electric arc phenomena can occur. Thus, each electrode is preferably round, oval or oblong in shape.

Preferably, each of the first and second electrodes has a globally plane inner surface facing the other electrode.

Alternately, each of the first and second electrodes has an inner surface oriented towards the other electrode, provided with a peripheral rim projecting towards this other electrode, the junction between the inner edge of the peripheral rim and the inner surface of the electrode being rounded. This rounded shape can result in better cleaning, reduce micro-organism retention zones and produce a zone in the immediate vicinity of the insulating seal with a slightly lower field to limit the probability of formation of an electric arc.

According to yet another alternative, each of the first and second electrodes has an inner surface oriented towards the other electrode, provided with a bushing projecting towards this other electrode and facing the product inlet or outlet conduit associated with this other electrode. Advantageously, this makes it easy to set up hydrodynamic conditions within the treatment zone.

Preferably, the pulse generator is a conventional type known to those skilled in the art, capable of generating high voltage pulses.

Preferably, the device is suitable for the treatment of liquid or semi-solid foodstuffs, or water and sludge.

It is also possible to treat other products. Some non-limitative examples are given below.

For example, the treatment is applied to a liquid medium containing eukaryote and/or prokaryote cells and/or eubacteria with animal or vegetable origin, single cells such as yeasts, fungi, algae and other living forms such as virus, phages, etc.

It can also be applied to all or some multi-cell organisms with animal origin (protozoa, larvae, etc.) or plant origin (whole and/or partial fruit, beetroot, etc.).

When they are living, cells from single-cell organisms may be in a latent, growth phase, (vegetative cells) or stationary, or even sporulated.

There may be several purposes to treatment:
sterilisation or pasteurisation of liquids (water, effluents, fruit juice, milk, egg white, etc.);
pretreatment and sanitisation of water treatment plant sludge before spreading, or dehydration before drying;
bursting of fruit or algae cells before pressing to obtain a fruit juice or fat extract, by facilitating the mechanical pressing operation or any other extraction treatment (by organic solvent, supercritical fluid, etc.);
treatment of cells by genetic manipulations to contribute to the introduction of exogenic molecules (DNA, RNA, proteins, etc.).

Other characteristics and advantages of the invention will become clear in the non-limitative description given below.

BRIEF DESCRIPTION OF THE DRAWINGS

This description will be made with reference to the appended drawings among which.

DETAILED DESCRIPTION OF PREFERRED EMBODIMENTS

FIGS. 1 to 7 show a device 1 for treatment by pulsed electric field according to various preferred embodiments of the invention.

A product to be treated is circulated by conventional movement means in a treatment zone 2 of the device 1, along a principle direction of circulation of the product represented by the arrow A. A pulsed electric field is applied inside the treatment zone 2 to perform the desired treatment.

As will be described in detail below, the field lines of the pulsed electric field are orthogonal to the direction A within the treatment zone 2 in this invention.

Any type of product may be treated. For example, products include liquid foodstuffs such as milk, orange juice and egg-white, semi-solid foodstuffs, water to be made drinkable, and sludge.

The purpose of treatment by pulsed electric field is to eliminate undesirable organisms that have colonised the product.

Figure 1:
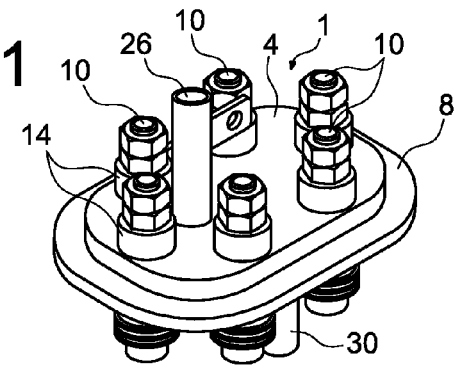
FIG. 1 shows a perspective view of a treatment device according to a first preferred embodiment of the invention.
Figure 2:
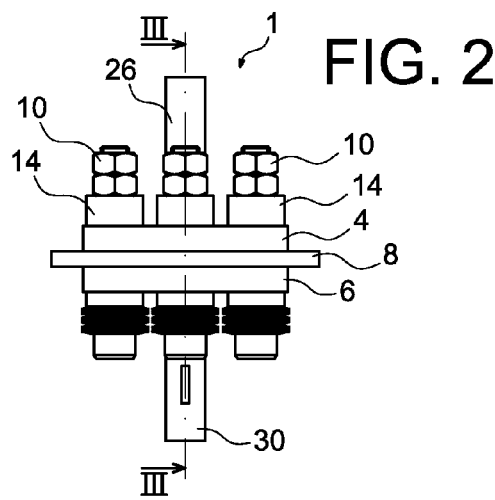
FIG. 2 shows a side view of the device shown in FIG. 1.
Figure 3:
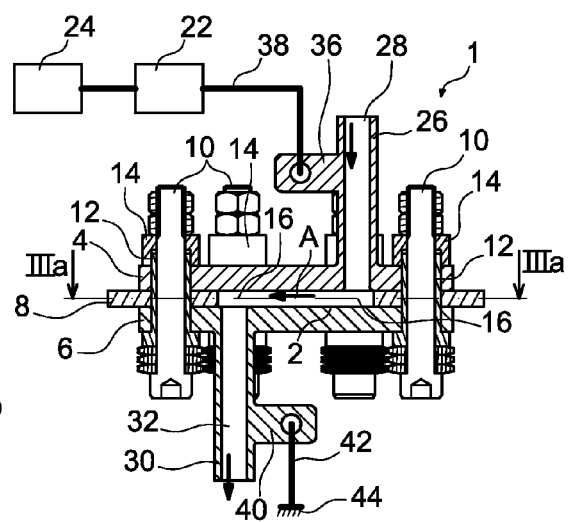
FIG. 3 shows a sectional view along line III-III in FIG. 2.

With reference firstly to the first preferred embodiment shown in FIGS. 1 to 3, it can be seen that the treatment device 1 comprises two electrodes each forming a thin plate. There is a first electrode 4 and a second electrode 6 laid out parallel to and at a distance from each other. As will be described below, these two electrodes 4, 6 have opposite polarities so that when they are used together and with a pulse generator 22, a pulsed electric field is generated in zone 2.

This treatment zone is effectively delimited at the top and at the bottom by the two electrodes 4, 6 respectively. It is delimited laterally by an electrically insulating seal 8 around the periphery of the two electrodes that are in the form of a plate, between which it is squeezed. This seal 8 runs along a closed line without any sharp corners, particularly with no right angle corners, and which has a circular, oval or oblong shape. The straight edge of each of the two electrodes 4, 6 follows the same shape of line.

Figure 3A:
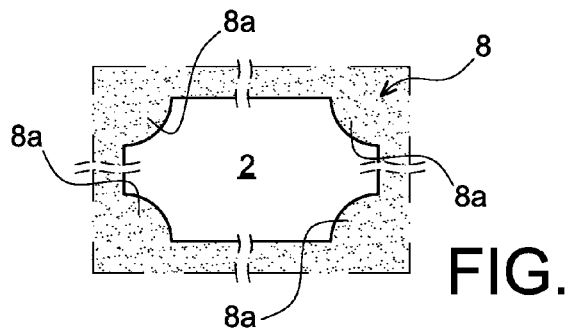
FIG. 3*a* shows a sectional view along line IIIa-IIIa in FIG. 3, with a different embodiment of the seal.

Alternately, as can be seen for example on FIG. 3*a*, the seal 8 may have a globally convex inner rim 8*a* at each corner, facing the inside of the treatment zone 2. This limits edge effects at these corners, where the electric field might be locally much more intense. Nevertheless, the seal 8 still has a global shape of the type mentioned above, namely with no sharp corners and particularly no right-angle corner and may have a circular, oval or oblong shape.

Therefore, in this case the treatment zone 2 is delimited only by the two electrodes and by the seal held in place in compression between the electrodes. Compression is preferably applied using bolts 10 arranged orthogonally to the electrodes. This can be achieved by making through holes in each electrode through which insulating sleeves 12 pass, with the bolt screws passing inside the sleeves. Similarly, insulating washers 14 are inserted between the bolt nuts and the first electrode 4 to prevent direct bearing on the electrode.

Therefore the height of the zone 2 that is its smallest dimension is defined by the thickness of the seal 8 held in place between the two electrodes by the compression force applied by the bolts 10. For example, there may be six bolts distributed uniformly around the periphery of the electrodes.

In this first preferred embodiment of the invention, the first and the second electrodes 4, 6 each have a globally plane inner surface 16 facing the other electrode and bearing on the seal 8. This design minimises the presence of cavities such as grooves or cracks that can contain micro-organisms that could not be adequately treated during the first electrical pulses.

Furthermore, the treatment device 1 comprises a product inlet conduit 26 into zone 2, this conduit being firmly connected to the first electrode 4 with which it is in contact. Preferably, these two elements 4, 26 are connected fixed to each other, for example by welding, or are made from a single piece. The conduit 26 defines a channel 28 with its centre line approximately orthogonal to the electrode 4. This channel 28 may extend as far as the treatment zone 2, or it may lead to an orifice passing through the electrode 4, itself opening up into zone 2. In any case, the product circulating in the channel 28 finally penetrates into the treatment zone 2, inside which it flows along the direction A.

Similarly, the treatment device comprises an outlet conduit 30 through which the product is taken out of zone 2, this conduit being firmly connected to the second electrode 6 with which it is in contact. Preferably, these two elements 6, 30 are fixed tightly to each other, for example by welding, or may be made from a single piece. The conduit 30 defines a channel 32 with its centre line approximately orthogonal to the electrode 6. This channel 32 may extend as far as the treatment zone 2, or it may lead to an orifice passing through the electrode 6, itself opening up into zone 2. Therefore, the product flowing along direction A inside zone 2 finally leaves the zone by entering channel 32, since conduits 26, 30 are at opposite ends of the zone 2 along the direction A.

One of the special features of this invention is that the conduit 26 is used not only for bringing the product into the treatment zone 2, but also to bring the first electrode 4 to the required potential.

The conduit 26 is provided with an attachment lug 36 that electrically connects it to the pulse generator 22 through an electrical cable 38.

Similarly, the conduit 30 is used not only to remove the product outside the treatment zone 2, but also to bring the second electrode 6 to the required potential. In this case, the conduit 30 is provided with an attachment lug 40 to electrically connect it to the ground or to the earth 44 through an electrical cable 42. Alternately, the second lug may be electrically connected to a second output terminal from the pulse generator 22 at an absolute potential value lower than the absolute potential value of its first terminal connected to the conduit 26.

Consequently, the electrodes 4, 6 are brought to their corresponding potentials through conduits 26, 30, such that these conduits perform two functions, thus simplifying the global design of the device.

The pulse generator has a conventional design known to those skilled in the art. It can generate high voltage pulses, for example for a duration of 1 µs to 1 ms, at an intensity of between 7000 V/cm and 100 000 V/cm.

The area of each electrode 4, 6 delimiting the zone 2 is a few square centimetres, for example 0.1 to 100 $cm^2$, and preferably between 1 and 50 $cm^2$, to output a peak current density between 100 and 5 000 $A/cm^2$, possibly up to a maximum of 10 000 $A/cm^2$.

Finally, for more efficient treatment of the product, the device 1 is made such that the product circulates continuously in the treatment zone 2, along direction A, and that the pulsed electric field is uniform. This pulsed electric field is transverse, namely the direction of its field lines is approximately orthogonal to the principal direction A of product circulation.

With this configuration, the product circulating in the treatment zone 2 is preferably only in contact with two distinct materials, the first conducting material being used to make the electrodes 4, 6 and conduits 26, 30, and the second electrically insulating material used to make the seal 8.

The first material is preferably selected to resist electrochemical phenomena. For example, it may be made of stainless steel or titanium, alloys such as inconel, monel, or graphite, or any other electricity conducting material, particularly among composite materials.

The second material has good mechanical strength so that it does not creep at high temperature and under the compression pressure. It may be of the PTFE, PVDF, PET, EPDM type, or silicone or any other type of elastomer or non-elastomer material.

In the first preferred embodiment, the electrodes may be encased by an insulating casing surrounding the device although this has not been shown.

Figure 4:
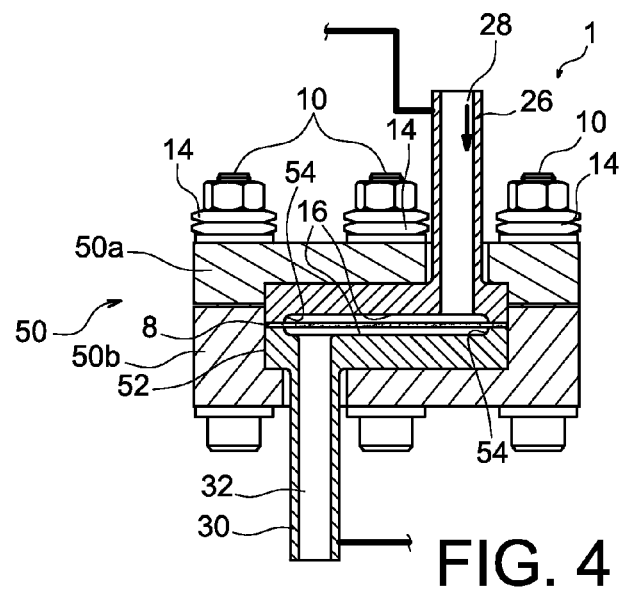
FIG. 4 shows a view similar to FIG. 3, with the treatment device in the form of a second preferred embodiment of the invention.
Figure 5:
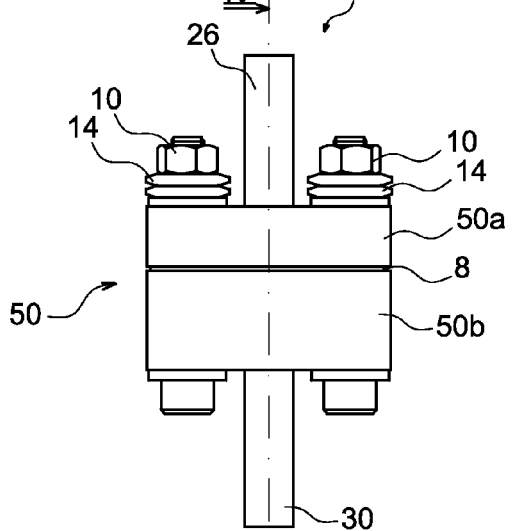
FIG. 5 shows a side view of the treatment device shown in FIG. 4.

Such a casing 50 is shown in FIGS. 4 and 5 illustrating a second preferred embodiment. In this case, the casing is made with an upper part 50a and a lower part 50b encasing the electrodes 4, 6. These two parts are held compressed in contact with each other by bolts 10 that pass through them. Therefore these bolts no longer act directly on the electrodes, but on the casing parts 50a, 50b that surround them. Furthermore, the bolts do not necessarily pass through the electrodes, but only through the casing that holds the electrodes in compression so that there is no longer any need for the insulating sleeves described above. This casing can also act as a clamping jaw, such that a lever or collar clamping device can tighten the jaws, the electrode and the seal. In this case, there is no longer any need for the bolts, and assembly and disassembly operations are simplified.

In this second preferred embodiment, the inner surface 16 of the electrodes is no longer completely plane, but has a projecting peripheral rim 52 projecting towards the other electrode. The seal 8 is then compressed between these two peripheral rims 52 facing each other directly. Moreover, the junction 54 between each inner flank of the peripheral rim 52 and the inner surface 16 of the electrode is rounded. This can limit the presence of retention zones, facilitate cleaning and limit the probability of electric arcs.

Another advantage of globally plane parallel electrodes containing globally orthogonal inlet and outlet orifices is to produce hydrodynamic turbulence that has a synergetic effect with the electric field. This is because a micro-organism affected by turbulence is oriented at random in different directions relative to the electric field, and is impacted by said electric field over its entire surface.

Figures 6, 7:
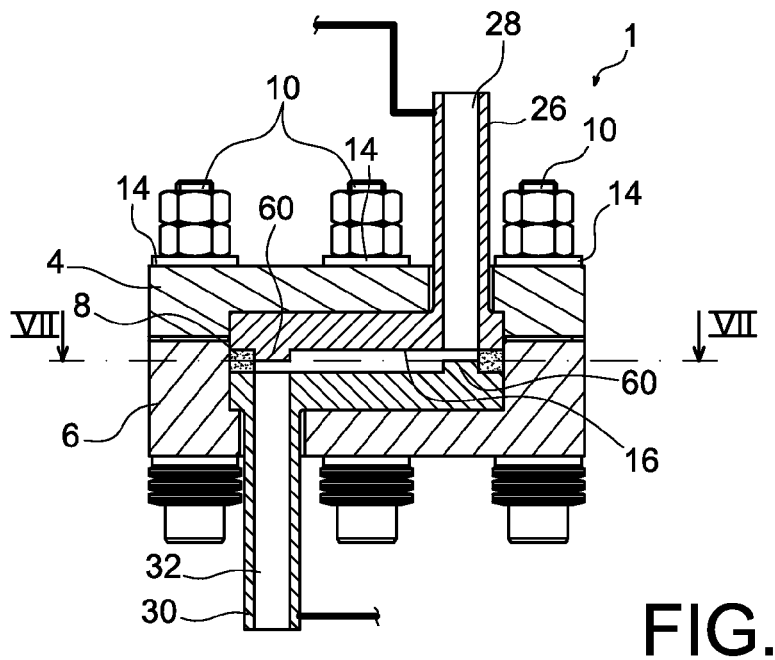
FIG. 6 shows a view similar to the view in FIG. 3, with the treatment device in the form of a third preferred embodiment of the invention.
FIG. 7 shows a sectional view along line VII-VII in FIG. 6.

Finally, according to a third preferred embodiment of the invention shown in FIGS. 6 and 7, the inner surface 16 of each electrode 4, 6 has a bushing 60 projecting towards the other electrode, and arranged facing the product inlet or outlet conduit 26, 30 associated with this other electrode. This bushing 60 is preferably hemispherical in shape.

Preferably, the diameter of this bushing that extends into the treatment zone 2, is the same as or similar to the inside diameter of the conduit 26, 30 that it is facing.

Figure 8:
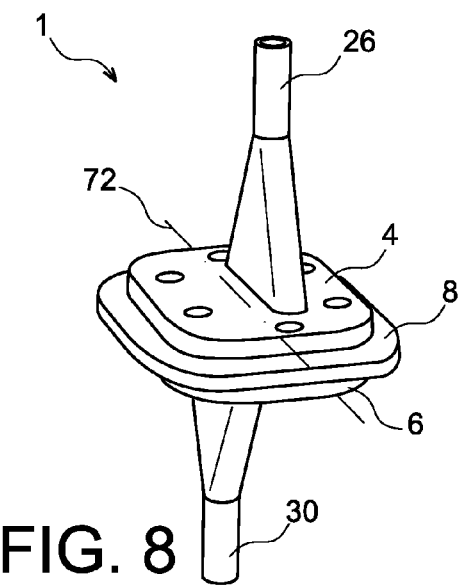
FIGS. 8 to 10 show perspective views of the device 1 provided with product inlet and outlet conduits with a different shape.
Figure 9:
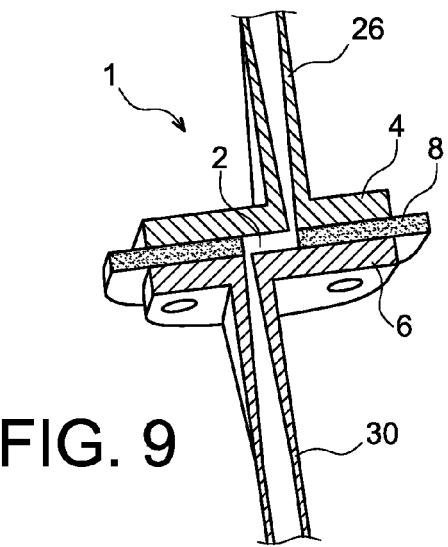
Figure 10:
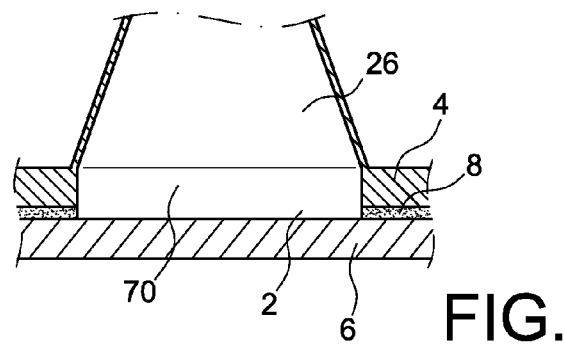

Regardless of which embodiment is envisaged, it is planned that each conduit 26, 30 should have a constant circular cross-section. Alternately, as shown diagrammatically in FIGS. 8 to 10, each conduit 26, 30 may be tapered, in other words it gets wider towards the treatment zone, for example in a triangular manner starting from a circular cross-section. The opening 70 of the conduit at the junction with the treatment zone 2 may also have the same or a similar dimension to the dimension of the treatment zone 2, for example with a rectangular or oblong shape, allowing a flow in the form of a liquid stream reducing hydraulic pressure losses. The widened opening 70 may naturally be smaller than the opening of the treatment zone 2, without going outside the scope of the invention. As in the other embodiments, it can be seen in FIGS. 8 and 9 that the two conduits 26, 30 are arranged symmetrically about a line of symmetry 72 of the device.

Obviously, those skilled in the art could make various modifications to the invention as described above, solely as non-limitative examples.

What is claimed is:

1. Device (1) for the treatment by a pulsed electric field of a product intended to circulate through this device, this device comprising first and second electrodes (4, 6) forming parallel plates between which a treatment zone (2) is defined, and also comprising a pulse generator (22) electrically connected to at least said first electrode (4) so as to be able to apply a pulsed electric field in the treatment zone (2) through which said product will flow, the pulsed electric field having a direction approximately orthogonal to a principal product flow direction (A) between the two electrodes, said device also comprising a product inlet conduit (26) into said treatment zone and a product outlet conduit (30) through which the product exits from the treatment zone, characterised in that said first electrode (4) is electrically connected to the pulse generator (22), and said first electrode (4) and the pulse generator (22) are electrically connected to either the inlet conduit or the outlet conduit (26, 30).

2. Treatment device (1) according to claim 1, characterised in that said second electrode (6) is in contact with the other product inlet or outlet conduit (26, 30), this conduit being used to apply a potential with a lower absolute value than the potential for said first electrode, to said second electrode.

3. Treatment device (1) according to claim 1, characterised in that said product inlet conduit and outlet conduit (26, 30) are oriented to be approximately orthogonal to said first and second electrodes (4, 6).

4. Treatment device (1) according to claim 1, characterised in that said first and second electrodes (4, 6) are kept at a certain distance from each other by an electrically insulating seal (8) squeezed between these two electrodes.

5. Treatment device (1) according to claim 4, characterised in that said treatment zone (2) is defined exclusively by the seal (8) and by the first and second electrodes (4, 6).

6. Treatment device (1) according to claim 1, characterised in that each of said first and second electrodes (4, 6) has one edge with no sharp corner.

7. Treatment device (1) according to claim 1, characterised in that each of the first and second electrodes (4, 6) has a globally plane inner surface (16), facing the other electrode.

8. Treatment device (1) according to claim 1, characterised in that each of the first and second electrodes (4, 6) has an inner surface (16) oriented towards the other electrode, provided with a peripheral rim (52) projecting towards this other electrode, the junction between the inner edge of the peripheral rim (52) and the inner surface (16) of the electrode being rounded.

9. Treatment device (1) according to claim 1, characterised in that each of the first and second electrodes (4, 6) has an inner surface (16) oriented towards the other electrode, provided with a bushing (60) projecting towards this other electrode, and facing the product inlet or outlet conduit associated with this other electrode.

* * * * *